(12) United States Patent
Murray et al.

(10) Patent No.: US 6,901,347 B1
(45) Date of Patent: May 31, 2005

(54) AVAILABILITY, RELIABILITY OR MAINTAINABILITY INDEX INCLUDING OUTAGE CHARACTERIZATION

(75) Inventors: Paul S. Murray, Los Gatos, CA (US); Karen Learn, Milpitas, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/510,938

(22) Filed: Feb. 22, 2000

(51) Int. Cl.[7] .................................................. G06F 11/00

(52) U.S. Cl. ................... 702/182; 702/182; 702/187; 702/179; 702/81; 709/224; 700/90; 700/108; 700/111

(58) Field of Search .................... 702/81, 84, 179–183, 702/186, 187, 119, 122, FOR 103, 104, 111, 112, 134, 135, 137, 139, 170, 171; 700/90, 91, 108, 111; 709/224, 100, 104, 200, 318

(56) References Cited

U.S. PATENT DOCUMENTS 5,031,124 A * 7/1991 Bosinoff et al. ....... 364/551.01

OTHER PUBLICATIONS

Tyco Electronics, Reliability Prediction of Board–Mounted Power Modules Jul. 1997, Tyco, pp. 1–6.*
Barringer, Life Cycle Cost & Reliability for Process Equipment Jan. 1997, American Petroleum Institute, 8th Volume, pp. 1–22.*
Colby, LEAP Fine Timing Hardware and Software Status Jan. 1998, Standford University, pp. 1–3.*

(Continued)

*Primary Examiner*—Marc S. Hoff
*Assistant Examiner*—Elias Desta
(74) *Attorney, Agent, or Firm*—Kent A. Lembke; William J. Kubida; Hogan & Hartson LLP

(57) ABSTRACT

Improved reliability, availability and/or maintainability metrics have been developed that account for customer perceived factors such as frequency of outage, duration of outages, business impact of outages, etc. In various realizations and exploitations, such improved metrics may be utilized for managing and/or monitoring availability of enterprise information services or suites, availability of individual computers, devices or facilities, and/or availability of particular functionality or subsystems of any of the above. In one exploitation, personnel management decisions and/or compensation levels may be based on achieved values for such improved metrics. In other exploitations, contractual commitments and/or incentive fees related to an installed system or systems may be based on such improved metrics.

23 Claims, 4 Drawing Sheets

OTHER PUBLICATIONS

Barringer, Availability, Reliability, Maintainability and Capability Feb. 18, 1997, TCTVI, pp. 1–11.*

Sun Microsystems Pairs Sun Enterprise SyMON with Leading System Management Solutions for Greater Levels of Availability, Sun Microsystems, Inc., Palo Alto, CA. Press Release Feb. 9, 1999, [online] [printed on Feb. 9, 2000] 3 pages. Retrieved from the Internet: <URL: http://www.sun.com/smi/Press/sunflash/1999–02/sunflash.990209.1.html>.

Sun Sets Agenda on Availability with New SunUP Program, Sun Microsystems Inc., Palo Alto, CA. Press Release Feb. 9, 1999 [online] [printed on Feb. 9, 2000] 4 pages. Retrieved from the Internet: <URL: http://www.sun.com/smi/Press/sunflash/1999–02/sunflash.990209.3.html>.

Sun and the Uptime Institute Join Forces, Enabling Customers to Track and Correct Causes of Downtime, Sun Microsystems, Inc., Palo Alto, CA. Press Release Feb. 9, 1999, [online] [printed on Feb. 9, 1999] 3 pages. Retrieved from the Internet: <URL: http://www.sun.com/smi/Press/sunflash/1999–02/sunflash.990209.6.html>.

SunUP: Sun's Availability Program, Sun Microsystems, Inc., Palo Alto, CA. White Paper, Mar. 1999, pp. 1–19.

Siewiorek, Daniel P. and Swarz, Robert S., Evaluation Criteria, The Theory and Practice of Reliable System Design, 1982, pp. I, II, 201–297, Digital Press, Educational Services, Digital Equipment Corporation, Bedford, Massachusetts.

* cited by examiner

| SERVER POPULATION: | 128 | | | | |
|---|---|---|---|---|---|
| | | | | | |
| CATEGORY: | <=5 MIN | 6<MIN<=15 | 16<MIN<=35 | >35 MIN | TOTAL |
| # PANICS: | 16 | 22 | 5 | 3 | 46 |
| PANICS/MACHINE: | 0.12500 | 0.17188 | 0.03906 | 0.02344 | 0.35938 |
| RELATIVE WEIGHT: | 100 | 400 | 4000 | 10000 | |
| | | | | | |
| SERVER PANIC INDEX: | 12.50 | 68.75 | 156.25 | 234.38 | 472 |
| CONTRIBUTION TO INDEX: | 2.65% | 14.57% | 33.11% | 49.67% | 100.00% |
| | | | | | |
| TARGET IMPROVEMENT: | 20% | | | | |
| TARGET INDEX: | 377.5 | | | | |
| | | | | | |

AVAILABILITY, RELIABILITY OR MAINTAINABILITY INDEX INCLUDING OUTAGE CHARACTERIZATION

BACKGROUND OF THE INVENTION

1. Field of the Invention

The present invention relates to characterization of availability and/or reliability of systems, and in particular, to methods of calculating and employing availability metrics that include outage and/or unavailability characterizations.

2. Description of the Related Art

Availability has become a universal concern for businesses of all sizes. Companies in every industry have developed an increased dependence on technology and information. Applications that make use of this information such as data warehousing, data mining, enterprise resource planning, and email have exploded in corporate infrastructures and have become essential to the conduct daily business. Globalization of business requires 24-hour application availability and eliminates periods of "acceptable" downtime. In the fast-paced environment of Internet access, downtime for one business becomes an instantaneous opportunity for another. In such a circumstance, application downtime can jeopardize not only the immediate business opportunity but also the customer and its future potential.

Under these pressures, companies must examine the impact each application has on their business. Applications vary in their importance along a continuum from the most important, mission-critical applications to less important, task-critical applications. Mission-critical applications impact revenue or service and cannot tolerate downtime. Task critical applications, by comparison, can handle some downtime as the primary effect of that downtime is inconvenience. By determining how critical an application is, an appropriate trade-off can be made between cost and availability. For example, a task critical application can tolerate more downtime because the costs associated with that downtime are relatively low. A mission critical application, by contrast, requires the highest availability because lost service is extremely costly. As the cost of downtime increases, businesses are challenged to improve their application availability.

To achieve maximum application availability, IT organizations must reduce both planned and unplanned downtime. Planned downtime results from known and predictable events that render the application unavailable for a predetermined amount of time. Examples of planned downtime include software and hardware upgrades. Unplanned downtime, by contrast, cannot be controlled and can occur as a result of human error or system failure. Although planned downtime accounts for the majority of total downtime, it is unplanned downtime that typically has the greatest business impact.

In order to meet the requirements of critical applications, IT managers must use a complete definition of "availability." From an end user's perspective, application availability is not simply whether it is possible to access an application. The concept of availability must also consider the performance and behavior of the application, or in other words, the service level provided. For example, if an end user can connect to a web site, but it takes several minutes to load each page, he/she may abandon the site and look for an alternative. The end result is the same as if the site had been unavailable for connection. So, complete availability planning should address both application access and the quality of the service provided Downtime, whether planned or unplanned, is the result of process, people or product related events and errors. Planned downtime, which includes software and application updates, is usually the result of necessary IT processes or product updates. Unplanned downtime has a different composition. According to industry analysts, process and people errors each account for 40% of unplanned downtime while product errors account for 20% of unplanned downtime. Process-, people- and product-related errors can be defined as follows. Process-related errors include those that result from poorly defined, planned or documented procedures during activities such as backup, change management or problem management. People-related errors can be introduced through any non-automated task that requires human intervention. People-related errors are often the result of inadequate training or lack of expertise. Product-related errors include operating system errors, hardware failure, power outages and disasters. To minimize downtime, companies need to take a comprehensive approach to assess and address all three sources of downtime-process, people and product.

A variety of measures have been used to characterize availability or reliability of systems. For example, availability of a system can be characterized as a function of time, $A(t)$, which is the probability that the system is operational at the instant, t. If $A(t)$ approaches a limit as t goes to infinity, then steady state availability, A, expresses a fraction of time that the system is available to perform useful computations. For example, a system which is available 99.5% of the time is said to have an availability metric, $A=0.995$. Availability is typically used as a figure of merit in systems in which service can be delayed or denied for short periods of time without serious consequences. Reliability, $R(t)$ is another metric and is typically defined as the conditional probability that the system has survived the interval $[0, t]$, given that it was operational at time $t=0$.

Other commonly used metrics include various "mean time" measures such as Mean Time To Failure, MTTF, which can be expressed as the integral (over time) of the reliability function, $R(T)$. In some utilizations, metrics are calculated from probabilistic models of component failure rates. In others, metrics are calculated based on statistical methods using actual failure statistics. Other useful metrics include Mean Time Between Failure (MTBF), Mean Time To Repair (MTTR), etc. See generally, Siewiorek & Swarz, The Theory and Practice of Reliable System Design, Digital Press, pp. 201-297 (1982) for a discussion of evaluation criteria and metrics.

Unfortunately, conventional availability or reliability metrics typically fail to account for business impact of failures. As a result, such metrics are not particularly useful in a feedback process for maximizing a level of customer perceived availability or reliability.

SUMMARY OF THE INVENTION

Accordingly, improved metrics have been developed that account for customer perceived factors such as frequency of outage, duration of outages, business impact of outages, etc. In various realizations and exploitations, such improved metrics may be utilized for managing and/or monitoring availability of enterprise information services or suites, availability of individual computers, devices or facilities, and/or availability of particular functionality or subsystems of any of the above. In one exploitation, personnel management decisions and/or compensation levels may be based on achieved values for such improved metrics. In other exploitations, contractual commitments and/or incentive fees related to an installed system or systems may be based on such improved metrics.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Although not limited thereto, some aspects of the present invention are described herein in the context of availability, reliability and/or maintainability issues typical of computers, information systems and subsystems, servers, workstations, operating systems, software applications, functionality, facilities and communication networks and interfaces typical of a networked computing environment. This context facilitates description of an exemplary set of realizations adapted for faults, service interruption, performance degradation and other availability, reliability and maintainability issues typical of computer and information-oriented environments. Nonetheless, the invention is not limited to characterization and utilization of availability, reliability and maintainability-oriented metrics for information systems. Rather, based on the description herein, persons of ordinary skill in the art will appreciate additional applications to a wide variety of systems susceptible to monitoring and for which business impact factors may be defined and associated with failure modes, events, service interruptions and/or performance or functionality degradation. For example, and without limitation, realizations for manufacturing equipment and process control systems (particularly those incorporating computer controls), office equipment, appliances, field-deployed test or measurement equipment, and mechanical systems and equipment are all envisioned.

Additionally, measures of availability, reliability, and maintainability are often used in the art with varying levels of precision. Accepted measures, indices, or Figures of Merit (FOMs) are often application specific. In some contexts, mathematically precise FOMs such as A, R(t), MTTF, etc. are contemplated, whereas in others, more empirically-based FOMs or ad hoc indices may be employed. For clarity of description, steady state availability and business impact factors typical of an information system environment are used herein. Nonetheless, based on the description herein, persons of ordinary skill in the art will appreciate other realizations and applications employing other FOMs and perceived business impact factors appropriate thereto. With the foregoing in mind, an illustrative computer and information systems-oriented realization is now described in greater detail.

Figure 1:
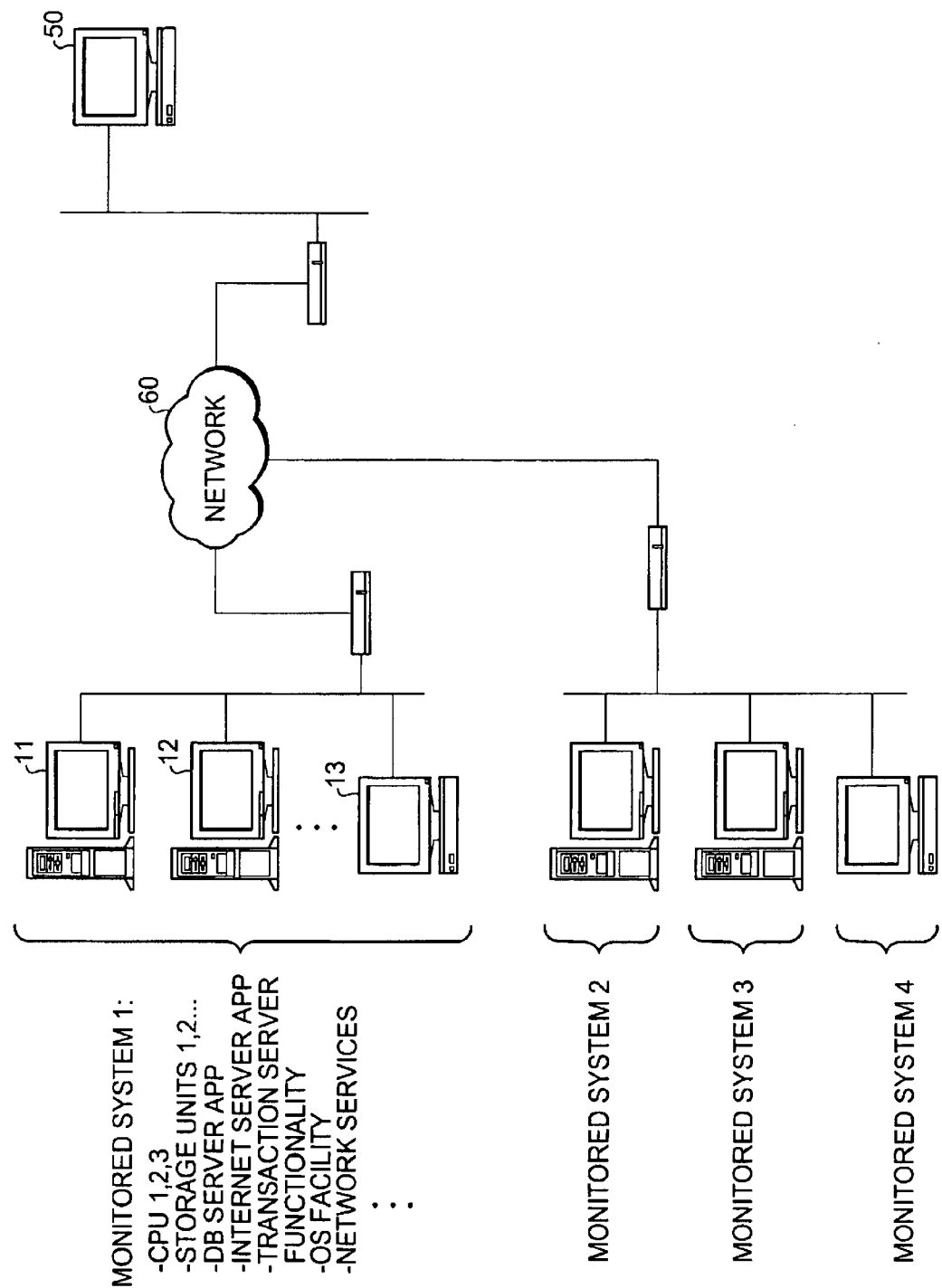
FIG. 1 depicts an illustrative set of computational systems for monitoring and/or characterizing using an availability, reliability or maintainability index including outage characterization in accordance with the present invention.

FIG. 1 depicts a set of monitored systems 1, 2, 3 and 4. Each is coupled to a monitoring system 50 via network 60. In the illustration of FIG. 1, monitored system 1 includes a variety of servers (e.g., servers 11 and 12) and workstation computers (e.g., workstation 13) together with various hardware subsystems, software applications, functionality and facilities. For example, monitored system 1 may include a variety of subsystems, e.g., CPUs, storage units (disk, tape, etc.), memory subsystems, device controllers, ports, communications interfaces, peripheral devices (printers, scanners, card readers, Point of Sale (POS) equipment, etc.), operating systems and firmware, services, software applications, etc. In some configurations, some or all of the subsystems may include redundant live spares, error correction, or other failure-tolerant facilities. Some subsystems may be more or less critical to certain business functions than others. Monitored systems 2, 3, and 4 are similar, although in general, monitored systems may vary widely in size, complexity, hardware and software configuration, business application and impact of failures, interruptions or performance degradations. Some monitored systems (or subsystems thereof) may be mission critical, while others may tolerate complete failure with little or no business impact.

Preferably, each of the monitored systems includes facilities for tracking system and/or subsystem state. For example, an automated state tracking tool may be installed on each monitored system, or optionally, on various computers of a monitored systems (e.g., servers 11 and 12 and workstation 13) to monitor state change events such as system up/down, hardware/software add/update/delete, etc.) In some realizations, such a state tracking tool may probe hardware and software configurations on detection of a event to characterize system state at or about the time of the event. Levels of probing may vary based on system configuration and/or event type. Similarly, system and subsystem monitoring may be provided at a variety of different levels of granularity depending on criticality of systems and desired specificity of cause tracking information. For example, in some realizations, monitoring may be at an aggregate system level (i.e., is the system up or down?). In others, fine grain tracking of individual subsystem, service and/or functionality may be provided. For example, in some realizations, status of an individual transaction processing or database system, payment authorization service, domain name service, web server, HyperText Transfer Protocol (HTTP) daemon, or eXtensible Markup Language (XML) parser may be tracked. Some realizations may track system, subsystem, service and/or functionality status as a binary state (e.g., up or down), while others may characterize interruptions and/or performance degradations. In systems with redundancy, failover status may also be tracked.

In the configuration of FIG. 1, an instance of the state tracking tool executes on each computer of monitored system 1 and communicates state change events and results of system probing back to monitoring system 50 via network 60. Of course, in other configurations (particularly networked configurations), multiple systems, subsystems and functionality may be tracked with a single instance of a state tracking tool. An encrypted communications channel or delivery mechanism is preferred in configurations where network 60 includes segments of a public network. In general, any of a variety of delivery mechanisms is suitable including secure eMaiL a file transfer protocol, shared memory or file systems, etc. Although an automated electronic communications mechanism is preferred, physical transfer of media encoding state change events and results of system probing may also be suitable for some applications. Finally, while some realizations may transfer data between organizations (e.g., between a customer and a vendor), other realizations may be employed wholly within an single organization.

In some realizations of a state tracking tool, user interface facilities may be provided for on-site personnel to associate additional information with a state change event. For example, in some realizations, a menu-selectable hierarchy of cause-codes may be provided and free-form text entry may allow entry of additional situation context information. In some realizations, facilities may be provided to explicitly identify a business impact, if any, associated with a state change event.

Figure 2:
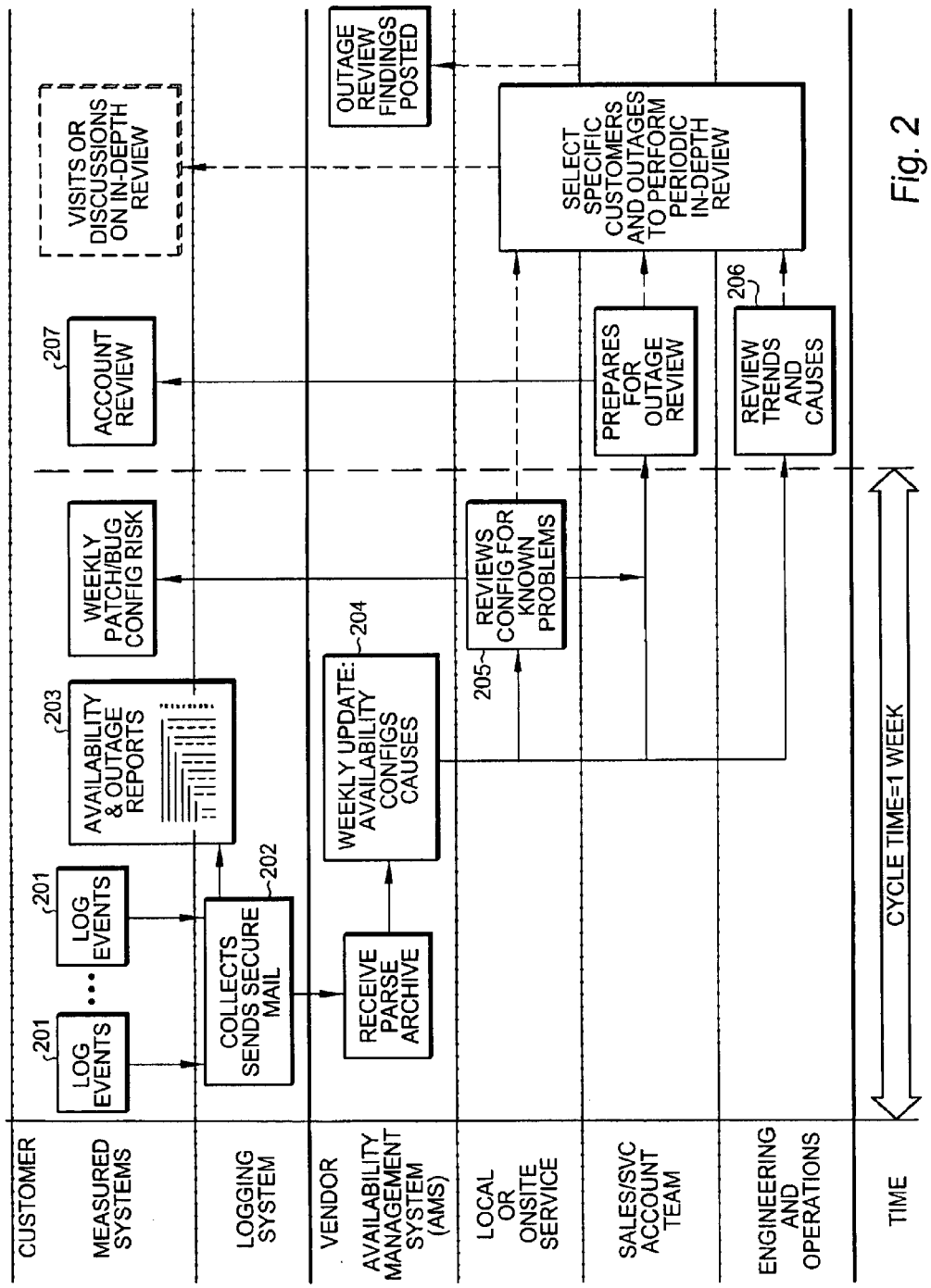
FIG. 2 depicts information flows in an exemplary availability, reliability or maintainability management system process whereby customer systems are remotely monitored by a vendor with a feedback loop into customer system configurations and/or account status in accordance with an embodiment of the present invention.

One set of information flows and feedback processes that may be implemented between a customer and an information systems or maintenance vendor is depicted in FIG. 2. Events are logged (201) for each of several systems, subsystems, and/or services. A logging system collects and transfers (202) event data to a vendor via a secure communications mechanism such as encrypted eMail. In an exemplary realization, availability and outage reports 203 are generated for on-site use, and in some realizations, to facilitate user entry of additional information such as cause-codes or situational context for transfer to the vendor. The vendor receives the archived event data, system probing data, and cause-codes and situational context (if provided) and updates a tracking database 204 of availability information, current configuration information, and failure causes (if known).

Depending on the structure of the vendor organization and its relationship with the customer, any of a variety of analysis and/or escalation paths may be appropriate. FIG. 2 illustrates one set of paths appropriate for a vendor-customer relationship that includes a local or on-site service component, a sales or service account management component and an engineering and operations component. Local or on-site service is typically responsible for reviewing (205) the contents of tracking database 204 for known problems and providing patches and bug fixes. Engineering and operations personnel may also review (206) contents of tracking database 204 to identify trends and causes of system failures, service interruptions and performance degradations.

In some realizations in accordance with the present invention, information flows and feedback processes may also involve a sales and/or service account management team that reviews contents of tracking database 204 using improved metrics or Figures of Merit (FOMs) that account for customer perceived factors such as frequency of outage, duration of outages, business impact of outages, etc. Exemplary FOMs are described in greater detail below. However, in the context of FIG. 2, such metrics may be utilized by the sales and/or service account management team for managing and/or monitoring availability of enterprise information services or suites, availability of individual computers, devices or facilities, and/or availability of particular functionality or subsystems in a way that more closely approximates impact on the customer's business.

Additionally, personnel management decisions and/or compensation levels may be based on achieved values for such improved metrics. For example, appropriate staffing levels, performance appraisals, salary and/or bonuses for members of the sales and/or service account management team (as well as for local or on-site service personnel) may all be assessed using such improved metrics. In addition, contractual commitments and/or incentive fees related to an installed system or systems may also be evaluated based on such improved metrics. For example, in some realizations in accordance with the present invention, periodic account review (207) may include review of availability, reliability and/or maintainability commitments of the vendor in light of the improved metrics. In this way, the customer vendor relation (including, in some realizations, fee levels, compliance with contractual provisions, etc.) may be reviewed in the context of business impact of outages.

Figure 3:
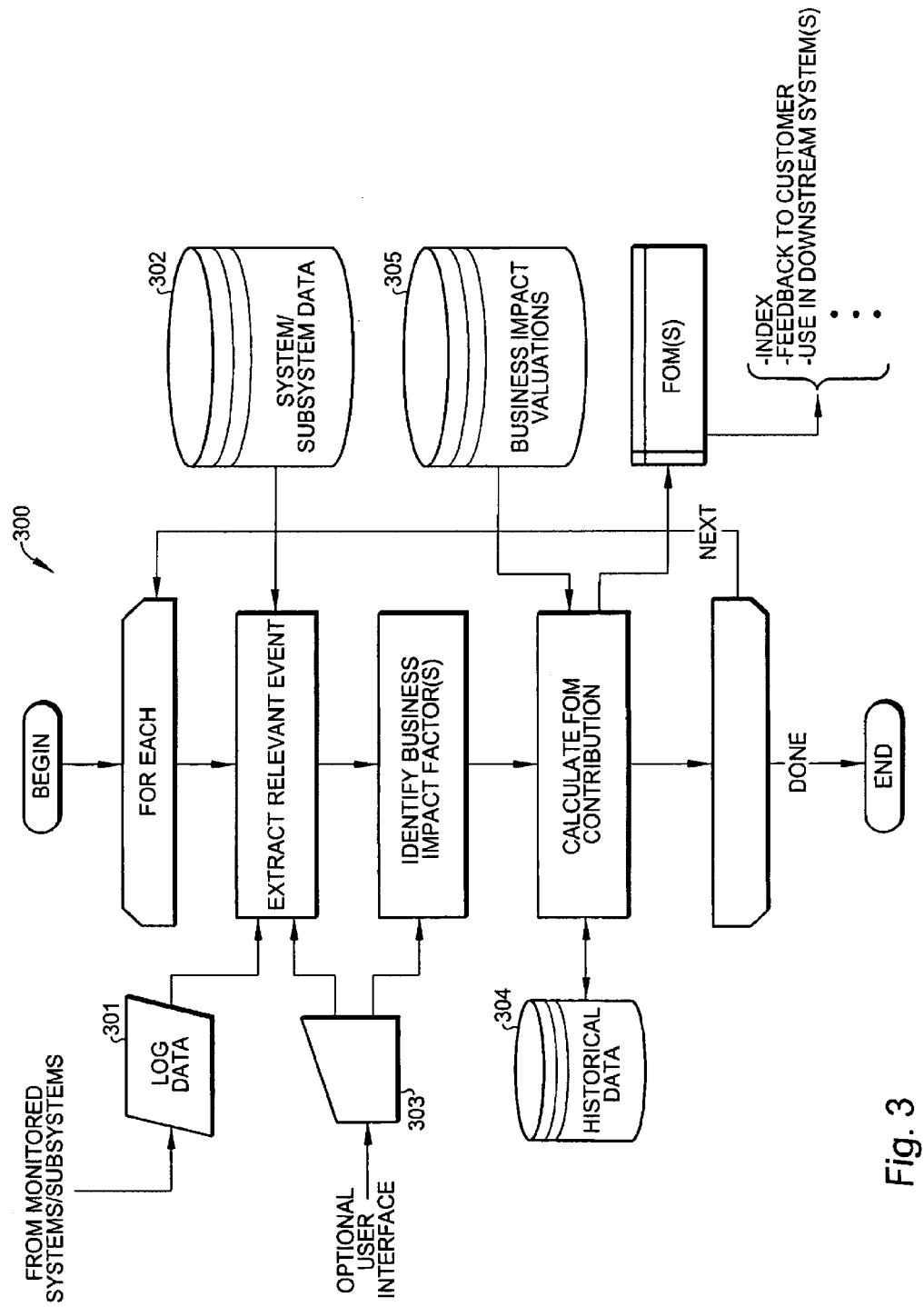
FIG. 3 is a flow chart of an illustrative computation of an exemplary availability, reliability or maintainability index including outage characterization in accordance with an embodiment of the present invention.

FIG. 3 illustrates operation 300 of a monitoring computational system for an exemplary availability, reliability or maintainability Figure of Merit (FOM) or index including outage characterization in accordance with an embodiment of the present invention. Log data 301 is obtained from monitored systems and/or subsystems using any appropriate method. For each event encoded in log data 301, relevant data is extracted from the log data and from other information sources as appropriate. For example, descriptive system and/or subsystem data may be retrieved from database 302. In some realizations, database 302 may encode sets of system components, services or functionality necessary to sustain particular business functions or levels of performance. For example, at least one of two redundant communications interfaces to payment system (e.g., credit card) transaction servers may be necessary to support an eCommerce system. State data for either (or both) of the redundant communications interfaces may be encoded in log data 301, while information identifying monitored system structure, including the redundant set of communications interfaces and establishing correspondence of communications interface states (e.g., at least one must be operational) to a business impact (e.g., transaction handling up or down) may be encoded in database 302. In some configurations, user entry (303) of additional data (e.g., characterizing the impact of an outage or identifying collateral systems affected) may be provided.

Figures 4A, 4B:
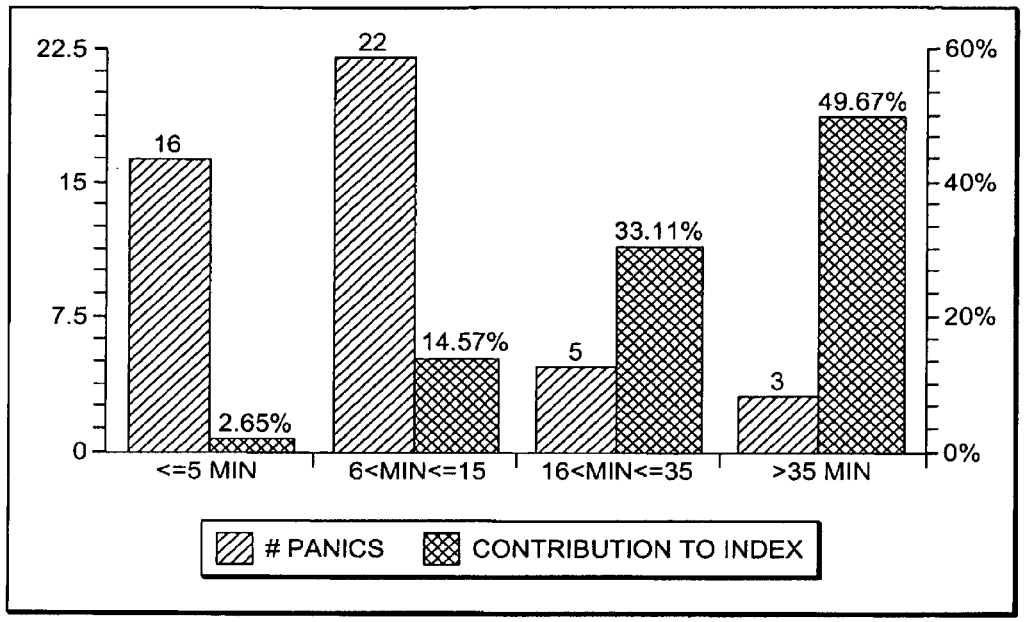
FIGS. 4A and 4B illustrate use of a server panic index, including a duration-oriented indicia in accordance with an embodiment of the present invention, in setting a weighted target index and/or measuring actual performance in accordance therewith.

Using relevant data extracted from log data 301 and monitored system/subsystem database 302, a monitoring system identifies the business impact factors corresponding to a particular event. Depending on the business impact (if any) of the event, an FOM or index is updated. In general, a wide variety of FOMs or indices are contemplated. For example, a modified steady state availability computation may weight events according to their business impact on the monitored system. In such a case, interruption of a peripheral or non-essential function of a transaction handling system (e.g., failure of a line printer interface) may be weighted with an small business impact valuation, whereas a failure of both communications interfaces to credit card transaction servers may be weighted with a large (or total) business impact valuation. One advantage of a weighted steady-state availability-type measure is the general familiarity persons in the art with "number of nines" based measures (e.g:, 0.9, 0.99, . . . ). Nonetheless, other FOMs such as the weighted panic indices illustrated in FIGS. 4A and 4B are also suitable. Of course, suitable definitions of a relevant FOM and business impacts will depend on the particulars of a monitored system configuration and valuations placed by a customer on particular subsystems, services, functionality, etc.

Because an instantaneous state view of availability may misstate the dissimilar business impact of long and short duration outages or of repeated outages (even if short in duration), some FOMs in accordance with the present invention may include indicia of outage duration and/or frequency. To support such valuations, operation of some monitoring systems may include access to historical data 304. In such configurations, repeated outages of a given system, subsystem, service or function may be weighted with higher business impact based on their frequency. In other configurations, a single long duration outage may be given greater weight in a FOM calculation than a larger number of shorter outages, despite identical total outage time. In some configurations, time of day may affect business impact of a given event or outage. Of course, any of a variety application- or system-specific weightings are possible and, based on the description herein, suitable weights will be appreciated by persons of ordinary skill in the art. Whatever, the mathematical definition of a particular FOM, monitoring system 300 calculates contributions of each relevant event based on a business impact valuation thereof. As previously described, a variety exploitations of such an FOM are contemplated, including as a index to characterize availability, reliability and/or maintainability of a given system or hardware/software offering, as a feedback indication to customers, as a measurable for contractual provisions, incentive fee arrangements and/or employee compensation, and as an input to downstream information systems.

FIGS. 4A and 4B illustrate use of a server panic index including a duration-oriented FOM weighting in accordance with an exemplary embodiment of the present invention. Based on a population of 128 servers and on a simple relevant event mix (e.g., server panics), increasing weights are assigned to panics (or outages) of increasing duration. For example, in the illustrated weighting scheme, an outage of greater than 35 minutes is assigned a weight (for use in calculating a server panic index FOM) of a hundred times that assigned to outages of less than 5 minutes. Other exemplary weights are illustrated in FIG. 4B. As illustrated in FIG. 4A, although short duration outages dominate the outage statistics (e.g., from an event log), contributions to the server panic index associated with longer duration outages dominate the FOM calculation. Although FIG. 4 illustrates results of a relative simplistic weighted FOM calculation, more complex formulations, including multi-variable formulations, will be appreciated by persons of ordinary skill in the art based on the description herein.

While the invention has been described with reference to various embodiments, it will be understood that these embodiments are illustrative and that the scope of the invention is not limited to them. Many variations, modifications, additions, and improvements are possible. For example, other measures of availability, reliability, and/or maintainability may be employed, including business impact weighted variants of accepted measures, indices or Figures of Merit (FOMs). Variants of mathematically precise statistically-oriented FOMs such as A, R(t), MTTF, may be employed. Alternatively, more empirically-based FOMs or ad hoc measures such as the illustrated server panic index may be employed. FOMs may incorporate a weighted allocation of business impact of subsystem, service and/or functionality outages or may take a binary view of total system availability (e.g., up or down) as with the illustrated server panic index. FOMs incorporating business impacts in accordance with the present invention may be used to characterize availability, reliability and/or maintainability issues typical of computers, information systems and subsystems, servers, workstations, operating systems, software applications, functionality, facilities and communication networks and interfaces typical of a networked computing environment. However, in addition, the techniques described herein may be applied to a wide variety of other systems susceptible to monitoring and for which business impact factors may be defined and associated with failure modes, events, service interruptions and/or performance or functionality degradation. Applications to networked information systems are merely illustrative and realizations for other systems, including without limitation, manufacturing equipment and process control systems, particularly those incorporating computer controls, office equipment, appliances, field-deployed test or measurement equipment, and mechanical systems and equipment are all envisioned.

More generally, plural instances may be provided for components described herein as a single instance. Boundaries between various components, services, and data stores are somewhat arbitrary, and particular operations are illustrated in the context of specific illustrative configurations. Other allocations of functionality are envisioned and may fall within the scope of claims that follow. Structures and functionality presented as discrete components or steps in the exemplary configurations may be implemented as a combined structure, component or step. These and other variations, modifications, additions, and improvements may fall within the scope of the invention as defined in the claims that follow.

What is claimed is:

1. A method of characterizing a system, the method comprising:
    logging outages of the system;
    measuring directly one or more additional indicia associated with each outage, the one or more additional indicia selected from frequency, duration and business impact of the outage; and
    calculating a Figure of Merit (FOM) by adding contributions of each outage, the outages being weighted in accordance with one of a plurality of relative weight values selected based on the associated additional indicia and wherein each of the relative weight values corresponds to a range of values of the associated additional indicia and wherein each of the relative weighted values differs from other ones of the relative weighted values.

2. The method of claim 1, wherein the FOM includes a business impact weighted availability, reliability or maintainability measure.

3. The method of claim 1, wherein the FOM includes a business impact weighted server panic index.

4. The method of claim 1, wherein the outage logging is performed on a system-wide basis.

5. The method of claim 1, wherein the outage logging is performed for individual subsystems, services and functionality of the characterized system.

6. The method of claim 1, wherein the outage logging encodes a level of performance degradation.

7. The method of claim 1, further comprising: remotely monitoring the outages and the one or more additional indicia; and performing the FOM calculating off-site from the characterized system.

8. The method of claim 1, further comprising: using the FOM as a factor in an employee compensation scheme.

9. The method of claim 1, further comprising: evaluating a service level commitment using the FOM.

10. The method of claim 1, further comprising: calculating an incentive fee using the FOM.

11. The method of claim 1, wherein the characterized system includes an information system.

12. A computer program product encoded in one or more computer readable media and comprising:
- instructions executable to obtain measure directly event data for one or more monitored systems;
- instructions executable to associate elements of the event data with business impacts thereof on the monitored system; and
- instructions executable to calculate a Figure of Merit (FOM) including contributions for each event data element the calculation including multiplying the contributions by a relative weight value corresponding to a particular one of the associated business impacts.

13. The computer program product of claim 12, wherein the event data include one or more of outages, service interruptions and performance degradations of the monitored systems and individual subsystems, services or functionality thereof.

14. The computer program product of claim 12, wherein the one or more computer readable medium are selected from the set of a disk, tape or other magnetic, optical, or electronic storage medium and a network, wireline, wireless or other communications medium.

15. A monitoring system comprising:
- an interface to event data that is directly measured for one or more monitored systems or subsystems; means for associating elements of the event data with business impacts thereof; and
- means for calculating a Figure of Merit (FOM) including contributions for the event data weighted in accordance with the associated business impacts.

16. The monitoring system of claim 15, wherein the means for calculating a Figure of Merit (FOM) includes instructions executable on the monitoring system to weight contributions to an availability, reliability or maintainability index in accordance with the associated business impact of each event on the monitored systems or subsystems.

17. The monitoring system of claim 15, wherein the event data include incidence and duration of server panics; and wherein the means for calculating a Figure of Merit (FOM) includes instructions executable on the monitoring system to weight contributions of each server panic to a server panic index in accordance a duration thereof.

18. The monitoring system of claim 15, further comprising:
- one or more state tracking tools executable on one or more of the monitored systems to supply the event data.

19. A method of monitoring a computer system, comprising:
- accessing log data for the computer system comprising data on occurrences of a monitored event in the computer system;
- determining a set of computational weights for the monitored event, each of the weights being applicable to a range of values of the occurrence data and the weights being based on a business impact valuation of the monitored event;
- calculating a set of index contributions by applying each of the weights to the occurrence data in the corresponding range of values; and
- combining the calculated index contributions to generate a figure of merit.

20. The method of claim 19, further comprising determining a difference between the figure of merit and a target index and reporting the difference.

21. The method of claim 19, wherein each of the weights has a different value, whereby each of the ranges of values is given a differing business impact valuation.

22. The method of claim 19, wherein the monitored event is a server panic, the occurrence data comprises a duration of a server panic, and the ranges of values comprises range duration.

23. The method of claim 20, further including generating a management decision based on the reported difference and wherein the management decision is selected from the group consisting of a personnel management decision, a compensation level decision, a performance appraisal, a contractual commitment decision, a contractual incentive fee decision relative to the computer system, and a vendor selection decision.

* * * * *